United States Patent
Jaeppelt et al.

(10) Patent No.: US 11,431,065 B2
(45) Date of Patent: *Aug. 30, 2022

(54) CAP FOR BATTERY TERMINAL

(71) Applicants: Clarios Germany GmbH & Co. KG, Hannover (DE); CPS Technology Holdings, LLC, New York, NY (US)

(72) Inventors: Ruediger Jaeppelt, Hildesheim (DE); Jason D. Fuhr, Sussex, WI (US); Jeffrey L. Troxel, Menomonee Falls, WI (US); William R. Murray, New Berlin, WI (US)

(73) Assignees: CPS Technology Holdings LLC, New York, NY (US); Clarios Germany GmbH & Co. KG, Hannover (DE)

( * ) Notice: Subject to any disclaimer, the term of this patent is extended or adjusted under 35 U.S.C. 154(b) by 60 days.

This patent is subject to a terminal disclaimer.

(21) Appl. No.: 16/926,865

(22) Filed: Jul. 13, 2020

(65) Prior Publication Data

US 2020/0343523 A1 Oct. 29, 2020

Related U.S. Application Data

(63) Continuation of application No. 16/293,434, filed on Mar. 5, 2019, now Pat. No. 10,714,734.

(Continued)

(51) Int. Cl.
*H01M 50/571* (2021.01)
*H01M 10/06* (2006.01)
(Continued)

(52) U.S. Cl.
CPC ......... *H01M 50/571* (2021.01); *H01M 10/06* (2013.01); *H01M 50/543* (2021.01); *H01M 50/561* (2021.01)

(58) Field of Classification Search
CPC .. H01M 50/571; H01M 10/06; H01M 50/543; H01M 50/561
See application file for complete search history.

(56) References Cited

U.S. PATENT DOCUMENTS

| | | |
|---|---|---|
| 1,759,043 A | 5/1930 | Derby |
| 3,992,224 A | 11/1976 | Fielding et al. |

(Continued)

FOREIGN PATENT DOCUMENTS

| | | |
|---|---|---|
| CN | 1161578 A | 10/1997 |
| CN | 2722446 Y | 8/2005 |

(Continued)

OTHER PUBLICATIONS

International Search Report and Written Opinion of the International Searching Authority dated Apr. 30, 2019, for International Appln. No. PCT/US2019/020808 filed Mar. 5, 2019, 19 pages.

(Continued)

*Primary Examiner* — Stewart A Fraser
(74) *Attorney, Agent, or Firm* — Boardman & Clark LLP

(57) ABSTRACT

Disclosed is a non-lead conductive cap for a battery terminal and battery. The battery may comprise a battery housing and a positive and negative terminal, the positive and negative terminal being accessible through the battery housing; wherein the positive and negative terminal further comprise an electrically conductive cap mounted on both the positive and negative terminal, wherein the electrically conductive cap does not comprise lead.

20 Claims, 7 Drawing Sheets

Related U.S. Application Data

(60) Provisional application No. 62/638,641, filed on Mar. 5, 2018.

(51) Int. Cl.
  *H01M 50/543* (2021.01)
  *H01M 50/552* (2021.01)

(56) References Cited

U.S. PATENT DOCUMENTS

| | | | |
|---|---|---|---|
| 4,062,613 | A | 12/1977 | Trienne |
| 4,075,368 | A | 2/1978 | Salamon et al. |
| 4,455,059 | A | 6/1984 | Theiler |
| 4,523,068 | A | 6/1985 | Lund |
| 4,898,796 | A | 2/1990 | Furukawa et al. |
| 5,326,655 | A | 7/1994 | Mix et al. |
| 5,709,967 | A | 1/1998 | Larsen |
| 5,905,002 | A | 5/1999 | Lund et al. |
| 5,931,690 | A | 8/1999 | Sai et al. |
| 6,001,506 | A | 12/1999 | Timmons et al. |
| 6,030,723 | A | 2/2000 | Nagano et al. |
| 6,152,785 | A | 11/2000 | Haller et al. |
| 6,342,680 | B1 | 1/2002 | Nakagawa et al. |
| 6,492,060 | B1 | 12/2002 | Timmons |
| 7,052,332 | B2 | 5/2006 | Heller et al. |
| 7,074,095 | B2 | 7/2006 | Perng |
| 7,429,199 | B2 | 9/2008 | Burgess |
| 10,211,445 | B2 | 2/2019 | Hasegawa et al. |
| 10,714,734 | B2 * | 7/2020 | Jaeppelt ................ H01M 10/06 |
| 10,811,667 | B2 * | 10/2020 | Koop ................... H01M 10/06 |
| 2001/0033171 | A1 | 10/2001 | Batson |
| 2002/0114994 | A1 | 8/2002 | Yabuki et al. |
| 2002/0119370 | A1 | 8/2002 | Ayres et al. |
| 2002/0180405 | A1 | 12/2002 | Batson |
| 2004/0079738 | A1 | 4/2004 | Sakamoto et al. |
| 2005/0084751 | A1 | 4/2005 | Ratte et al. |
| 2011/0039153 | A1 | 2/2011 | Nakayama et al. |
| 2012/0225331 | A1 | 9/2012 | Tartagalia |
| 2013/0143090 | A1 | 6/2013 | Hosota et al. |
| 2013/0323591 | A1 | 12/2013 | Woehrle et al. |
| 2019/0273241 | A1 | 9/2019 | Koop et al. |

FOREIGN PATENT DOCUMENTS

| | | |
|---|---|---|
| CN | 102593411 A | 7/2012 |
| CN | 202817079 U | 3/2013 |
| CN | 104282871 B | 1/2015 |
| EP | 0789411 A1 | 8/1997 |
| EP | 1229596 A1 | 8/2002 |
| GB | 2191331 A | 12/1987 |
| JP | 08102314 A | 4/1996 |
| JP | 09045309 A | 2/1997 |
| JP | 63175335 A | 7/1998 |
| JP | 10321199 A | 12/1998 |
| JP | 2004 055244 A | 2/2004 |
| WO | 9821765 A1 | 5/1998 |

OTHER PUBLICATIONS

International Search Report and Written Opinion of the International Searching Authority dated May 14, 2019, for PCT/US2019/020792 filed Mar. 5, 2019, 15 pgs.

Machine Translation of JPH08102314A (Jul. 17, 2019)(Year:2019).

odyssey.battery.com/batteries/designadvantages, printed web pages captured Feb. 24, 2020, 3 pages.

* cited by examiner

CAP FOR BATTERY TERMINAL

CROSS-REFERENCE TO EXTERNAL APPLICATIONS

This application claims priority to and is a Continuation of U.S. patent application Ser. No. 16/293,434, filed Mar. 5, 2019, entitled CAP FOR BATTERY TERMINAL, now U.S. Pat. No. 10,714,734, which claims the benefit of and priority to U.S. Provisional Patent Application No. 62/638,641 filed Mar. 5, 2018, entitled CAP FOR BATTERY TERMINAL, the entire contents of each of which are hereby incorporated by reference herein in their entirety.

FIELD OF INVENTION

The present disclosure relates to batteries. The present disclosure more specifically relates to external electrical connections for batteries.

BACKGROUND

In batteries with multiple cell elements, the cells are connected in series by conductive straps. The straps also connect the cells to a positive terminal and a negative terminal. These terminals are accessible outside the battery housing. These terminals allow for a vehicle (or other application) to connect to the battery for use. The conductive straps and terminals comprise a conductive material. Typically, in a lead-acid battery, this conductive material is comprised of lead.

Lead is a heavy metal and considered to be toxic. Any lead surface exposed to the environment is a potential source of contamination. Use of lead is therefore prohibited in many applications.

Known lead-acid batteries require interaction between a consumer or technician with the lead terminals in order to connect, change, or otherwise maintain the battery. Certain governmental bodies are advancing tighter regulation of lead in lead-acid batteries. For example, the European Union and the State of California have explored regulations about lead exposure as it relates to lead-acid batteries. For example, Department of Toxic Substances Control's (DTSC) in California is actively evaluating whether it should identify lead-acid batteries as a Priority Product under the Safer Consumer Products (SCP) program. Of particular concern is the exposure of consumers to lead dust by inhalation and ingestion during consumer use and replacement.

SUMMARY

Therefore, various embodiments of solutions are disclosed which seek to remedy the above deficiencies. More specifically, disclosed are various embodiments which may allow for access to the functionality of the battery without requiring a user to interact with or be exposed to the lead.

The present invention according to various embodiments relates to a lead acid battery having a positive terminal and a negative terminal. The positive and negative terminal may be designed, according to various embodiments of the invention, to limit exposure of any lead provided in the terminal.

The positive and negative terminals may be provided, according to various embodiments of the invention, with conductive covers (for example, electrically conductive caps) to limit exposure to lead provided in the terminal. In other words, the disclosed invention may allow for exposed surfaces of the battery to be free of lead.

The disclosed battery, terminal, and method, in one or more examples of embodiments, allows for electrical and mechanical attachment to a non-lead terminal surface of a battery. This may prevent or limit exposure to lead by consumers and technicians who work with a battery. The disclosed battery, terminal, and method may comprise a cover for a battery terminal having a conductive portion. The cover may comprise a cap. The cap, in various embodiments, may allow for attachment after formation of the battery. The cap may allow for an electrical connection to the battery terminal without exposure to a lead terminal. The cap may allow for this connection on a standard battery terminal.

Disclosed is a battery having a battery housing and a positive and negative terminal, the positive and negative terminal being accessible through the battery housing; wherein the positive and negative terminal further comprise an electrically conductive cap mounted on both the positive and negative terminal, wherein the electrically conductive cap does not comprise lead. Further disclosed is a battery wherein the electrically conductive portion of the cap comprises a conductive cage. Further disclosed is a battery wherein the cap is comprised of a material selected from the group of copper, brass, stainless steel, or nickel. Further disclosed is a battery wherein the cap is further comprised of a polymer or resin. Further disclosed is a battery wherein the cap further comprises an overmold. Further disclosed is a battery wherein the cap further comprises torque ribs.

Disclosed is a battery comprising: a housing comprising a cover and a battery element; a terminal facilitating electrical connection with the battery element which extends through the cover; and an electrically-conductive cap which receives a terminal; and wherein the electrically-conductive cap does not comprise lead. Further disclosed is a battery wherein the terminal comprises lead and the electrically-conductive cap covers all terminal lead. Further disclosed is a battery wherein electrically-conductive cap couples to the terminal by way of a friction fit. Further disclosed is a battery wherein the electrically-conductive cap connects to the using one or more components selected from the group of thermal press-fit, adhesive, glue, spin welding, heat sealing, laser welding, or an overmolded ring. Further disclosed is a battery wherein the electrically-conductive cap comprises a conductive cage. Further disclosed is a battery wherein the electrically-conductive cap is comprised of a material selected from the group of copper, brass, stainless steel, or nickel. Further disclosed is a battery wherein the electrically-conductive cap is further comprised of a polymer or resin.

Also disclosed is a battery having a battery housing and a terminal, the terminal being accessible through a battery housing; wherein the terminal does not comprise lead. Further disclosed is a battery wherein the housing comprises a cover, and the cover comprises a bushing, the bushing receiving the terminal. Further disclosed is a battery wherein the bushing comprises lead and is provided below a surface of the cover.

These and other features and advantages of various embodiments of systems and methods according to this invention are described in, or are apparent from, the following detailed description of various exemplary embodiments of various devices, structures, and/or methods according to this invention.

It should be understood that the drawings are not necessarily to scale. In certain instances, details that are not necessary to the understanding to the invention or render other details difficult to perceive may have been omitted. It should be understood, of course, that the invention is not necessarily limited to the particular embodiments illustrated herein.

DETAILED DESCRIPTION

Disclosed are various embodiments of a battery, battery terminal, and method for manufacturing the same. The disclosed embodiments of a battery, battery terminal, and method allow for access to an electrically-conductive terminal surface and battery functionality without exposure to lead on the surface of the terminal.

Figure 1:
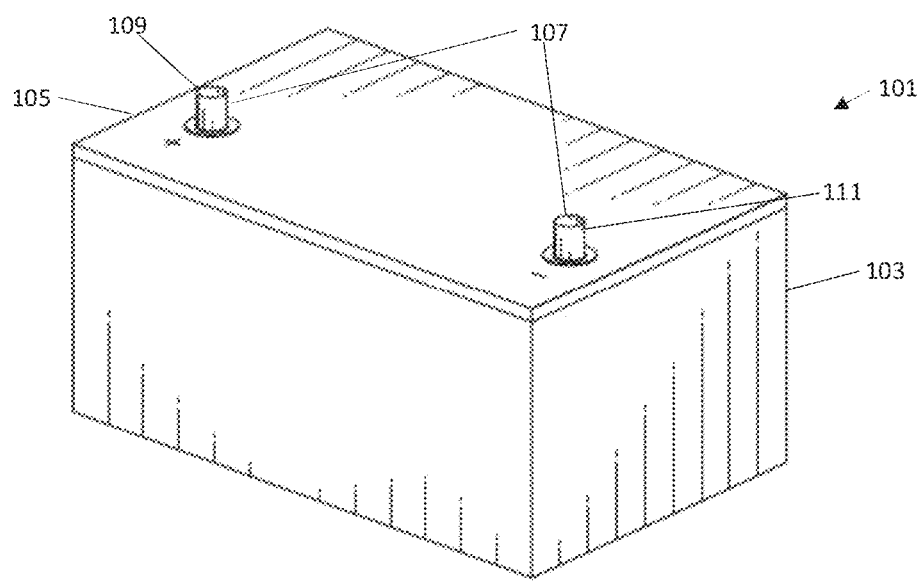
FIG. 1 shows a battery having a terminal, according to various examples of embodiments.

FIG. 1 shows a battery 101 having a housing 103. The housing 103 may further comprise a surface 105 (for example, a cover or lid). Protruding from the cover 105 can be seen two terminals 107. While terminals 107 are generally specified, the terminals 107 may comprise a positive terminal 109 or a negative terminal 111 (the phrase "terminal" may be used herein to describe a positive terminal 109, negative terminal 111 or both unless otherwise particularly specified). While the cover 105 is shown on a top of the battery 101 with the terminals 107 protruding towards an upper edge of the page, it should be understood the cover 105 and terminals 107 may be provided on any orientation, such as a side to allow access to terminals 107.

The various elements of the battery 101, the battery housing 103, the battery cover 105, and the cell containers may be made of a wide variety of known materials. For example, the cover 105, container/housing 103, and/or various components may be made of any polymeric (e.g., polyethylene, polypropylene, a polypropylene containing material, etc.) or composite (e.g., glass-reinforced polymer) material. For example, the container may be made of polypropylene-containing material (e.g., pure polypropylene, co-polymers comprising polypropylene, polypropylene with additives, etc.). Such polymeric material is relatively resistant to degradation caused by acid (e.g., sulfuric acid) provided within cells of the container or housing 103.

Figure 2:
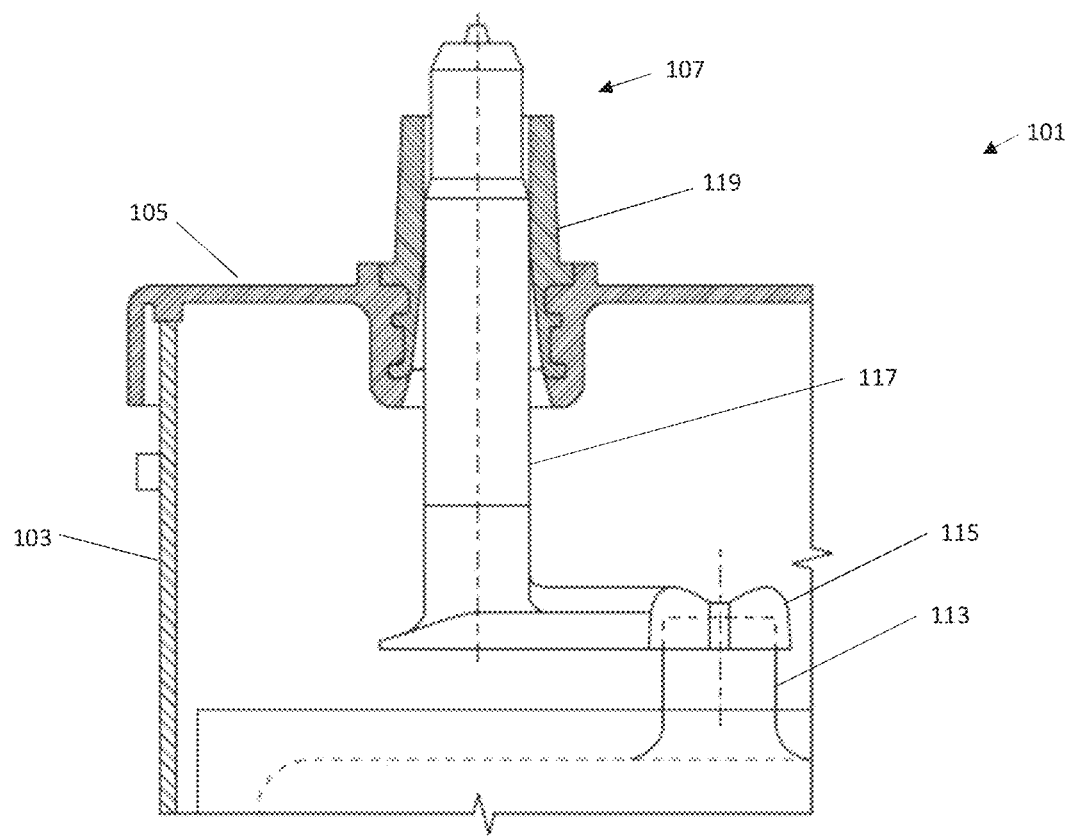
FIG. 2 shows a section of a battery having a known bushing and terminal, according to various examples of embodiments.

FIG. 2 shows an example of a section of a battery 101. The battery 101 includes a battery element 113 coupled to an end strap 115 which leads to a terminal post 117. The terminal post 117 extends through a bushing 119 provided within the cover 105 of the battery housing 103. This is one non-limiting example of a battery 101 which may be used with the devices (e.g. bushing 119, terminal post 117, and/or cover 105), systems, and methods described herein.

Figure 3A:
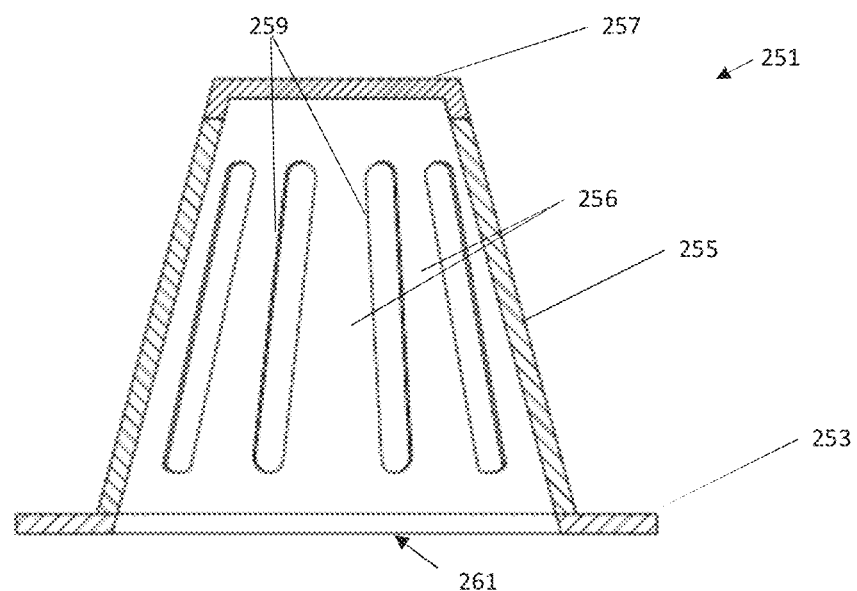
FIG. 3A shows a cross-section of a first cap for a battery terminal, according to various embodiments.

FIG. 3A shows a cross-section of a first cap 251 for a battery terminal 107 for a lead-acid battery 101, according to various embodiments. The cap 251 may be understood as sized to accept a battery terminal 107 (such as a positive terminal 109 or negative terminal 111) protruding from a lid or cover 105 of a battery housing 103. The cap 251 may be provided on top of a terminal post 117 and bushing 119, which may, for example be welded together to form a terminal 107 and facilitate connection between the terminal 107 and an electrical connector (not shown). The cap 251 may be understood to be electrically conductive, for example, but not limited to, in an electrically conductive portion (such as, but not limited to, a conductive cage 259).

The cap 251 may comprise at least an electrically conductive portion. In various embodiments, the electrically conductive portion comprises a conductive cage 259. The conductive cage 259 may generally comprise copper or other conductive metal. The conductive cage 259 may surround a battery terminal 107. Therefore, a bottom 253 of the cap 251 may be provided onto a top surface of a battery cover 105. In one or more examples the conductive cage 259 is filled, spaced apart, or alternates with a portion 256 which may be non-conductive comprising a substance such as a polymer or resin, for example, polypropylene. In other words, the sides 255 of cap 251 may comprise both a polymer or resin portion 256 as well as conductive material (conductive cage 259). These substances may be alternating, in various embodiments, about the cap 259. A top 257 and bottom 253 of the cap 251 may be comprised of a similar substance. The conductive cage 259 may provide a conductive material that is exposed on an internal surface (interior 261) as well as an external surface 263 of the cap. It should be understood the cap 251 comprising a conductive cage 259 provides electrical contact both with a terminal post provided within the cap and a connector provided externally to the cap. The cap 251 comprising a conductive cage 259 including the filled substance 256 therefore may facilitate connection by a standard battery connector with the terminal while preventing exposure to the lead terminal 107.

Figure 3B:
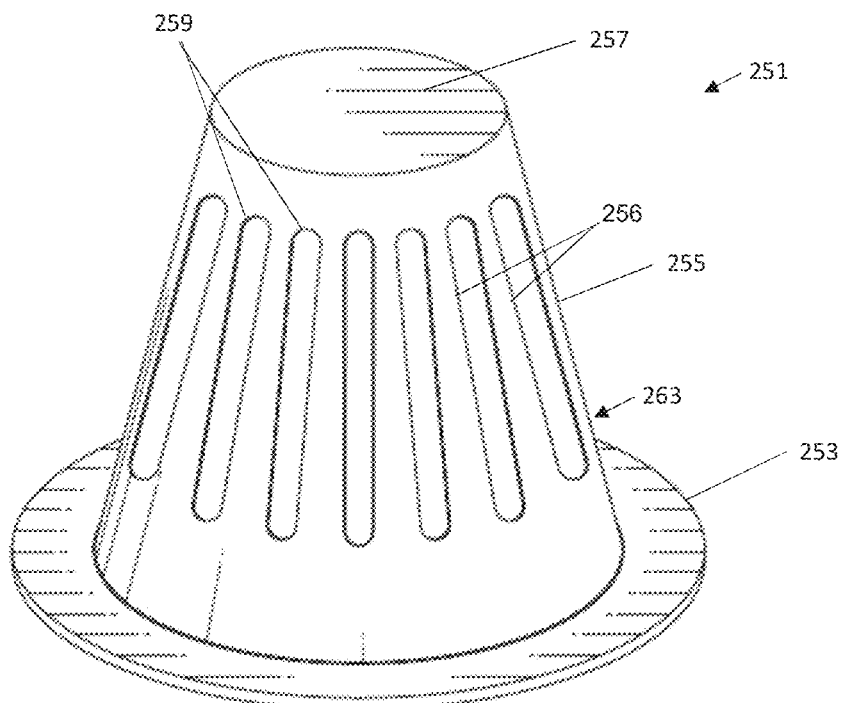
FIG. 3B shows a second view of the cap of FIG. 3A for a battery terminal according to various embodiments.

FIG. 3B shows a second view of the cap of FIG. 3A. In FIG. 3B, the conductive cage 259 comprises a number of vertical ribs spaced circumferentially around the sides 255 of the cap 251 which, when placed on battery 101, surround the terminal 107 (for example, positive terminal 109 or negative terminal 111). While vertical ribs are shown, other patterns such as a diagonal, spiral, horizontal ribs, or the like should be understood as within the scope of this disclosure. Again, the conductive cage 259 may be separated or filled in by a portion 256 comprising a substance such as a polymer or resin, for example polypropylene. Likewise, a top 257 and bottom 253 of the cap 251 may also be seen and may comprise such a polymer or resin.

Again, the conductive cage 259 may comprise a conductive material, which may include, but are not limited to, materials such as copper, brass, stainless steel, or nickel, or alloys/combinations thereof and the like. In various embodiments, the cap 251 may comprise a copper cage 259 filled with a material such as polypropylene 256. To this end, the cage 259 may allow for injection-molding of the non-conductive portions of the cap (top 257, bottom 253, spaces between ribs 256).

In one or more examples of embodiments, the cap 251 may be attached to a battery housing 103 (for example, cover 105) after being provided on top of a battery terminal 107. For example, the base or bottom 253 may fasten to the top (cover 105) of the battery 101. The cap 251 may, in various embodiments, be glued/molded/bonded to top 105 of battery 101. Then, a connector may be attached to the cap 251, facilitating connection with the battery 101 by way of the terminal 107.

Figure 4:
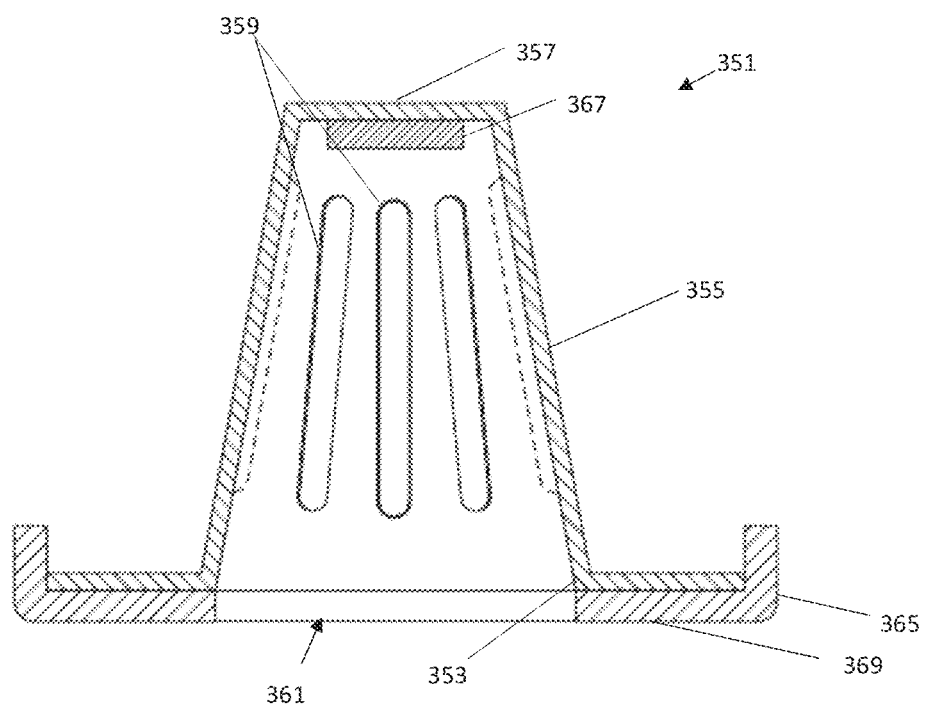
FIG. 4 shows a terminal cap for a battery terminal for use with one or more embodiments of a cap disclosed herein, according to various embodiments.

FIG. 4 shows another example embodiment of an electrically conductive cap 351 for a battery terminal 107, according to various embodiments. The electrically conductive cap 351 may be understood as provided on top of a battery terminal 107 in an interior 361 of the cap. The cap 351 may be comprised of an electrically conductive material that is resistant to acid. In one or more examples of embodiments, the cap 351 may be comprised, for example, of copper, brass, stainless steel, nickel, alloys or combinations thereof, or the like. The cap 351 may be comprised entirely of electrically conductive material or the cap 351 may include non-conductive components. For example, the cap 351 may include an overmolded ring 365 (for example, an overmolded resin ring) for facilitating fastening to the surface of a cover 105. In various embodiments, the overmolded ring 365 facilitates the joint connection to the battery cover 105. In various embodiments, connection to an exterior surface of the battery cover 105 is provided using an adhesive or a plastic that is molded over top of the cap 351. In various embodiments, the cap 351 is stamped out of a conductive material.

The cap 351 may further comprise a number of torque ribs 359. The torque ribs 359 may be stamped or otherwise formed into the cap 351. The torque ribs (or, in various embodiments, inward dimples) 359 may compress into the lead post 107 by an attached battery clamp providing the electrical connection and torque resistance. The cap 351 material may have a thickness sufficient to resist the clamping torque and abrasion. This way, the cap 351 may maintain coverage of the lead terminal 107 and prevent exposure thereof. In various embodiments, the thickness of the cap material may be from approximately 0.050 mm to approximately 1.5 mm. The torque ribs 359 may likewise be comprised of a conductive material.

As an alternative, solder 367 may be provided on the inside of the cap 351. The solder 367 may be tinned to the cap 351. The solder 367 may facilitate an electrical connection (i.e. a soldered connection) between the cap 351 and the terminal 107. The cap 351 may comprise a conductive material other than lead (for example, but not limited to, copper, brass, stainless steel, nickel, alloys or combinations thereof, or the like). The solder 367 may be localized to one surface (for example, under the top 357 of the cap 351) or on more than one or all surfaces (e.g. top 357, sides 355, and/or bottom 353).

FIG. 4 also shows a number of attachment mechanisms for providing the cap 351 onto a housing 103 or cover 105. For example, the cap 351 may attach by way of an overmold 365. The overmold 365 may allow for attachment by heating of a polypropylene or plastic or other suitable material, for example, between a bottom of the conductive material 353 and a top of a battery housing 103 or cover 105. While heating of the overmold 365 would facilitate connection between the cap 351 and battery housing 103 in various embodiments, other fastening mechanisms may be used to seal the cap 351 to the battery housing 103. For example, as described herein, an adhesive provided on a bottom surface 369 of the cap 351 may be used. In various embodiments, the cap 351 is sealed to the housing 103 after being positioned over the terminal post 107. The positioning of various embodiments of the cap (251, 351, 451, etc.) disclosed herein may be performed after terminal post weld (in other words, when bushing 119 and end strap 115 are joined to produce the terminal 107) or after full battery formation, in various embodiments.

For example, the cap 351 may be joined to the cover 105 by a joining process such as spin welding. As previously described, the cap may further comprise an overmolded ring 365 that can be heat sealed or laser welded to the cover 105. Alternately, the electrically conductive cap 351 may have an adhesive at the base (or bottom) (e.g. 353) which may then be attached to the surface of the battery cover 105. Some combination of the above may also be used. In addition, for attachment, the cap 351 may first be heated, then pressed onto the terminal 107. Also, torque ribs 359 in the heated cap 351 could be melted into the softer lead of the terminal 107 to make a robust connection.

Figure 6:
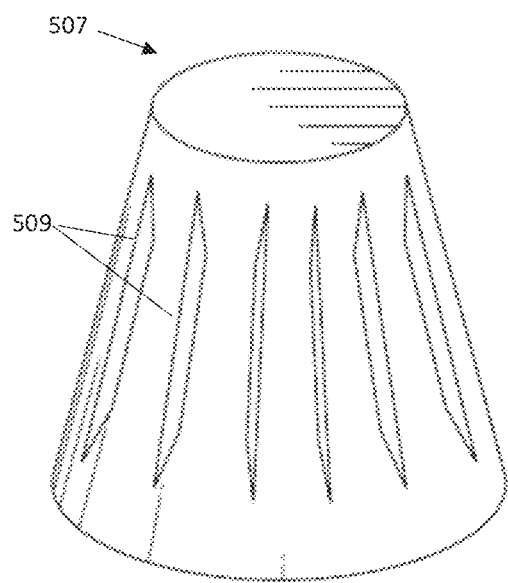
FIG. 6 shows an example bushing for a battery terminal, according to various embodiments.

In addition, as shown in FIG. 6, a bushing or terminal 507 (for example, positive and negative terminals) could also be designed with some grooves which may key into torque ribs (for example, 359 and 459) provided on the cap (351, 451).

Figure 5:
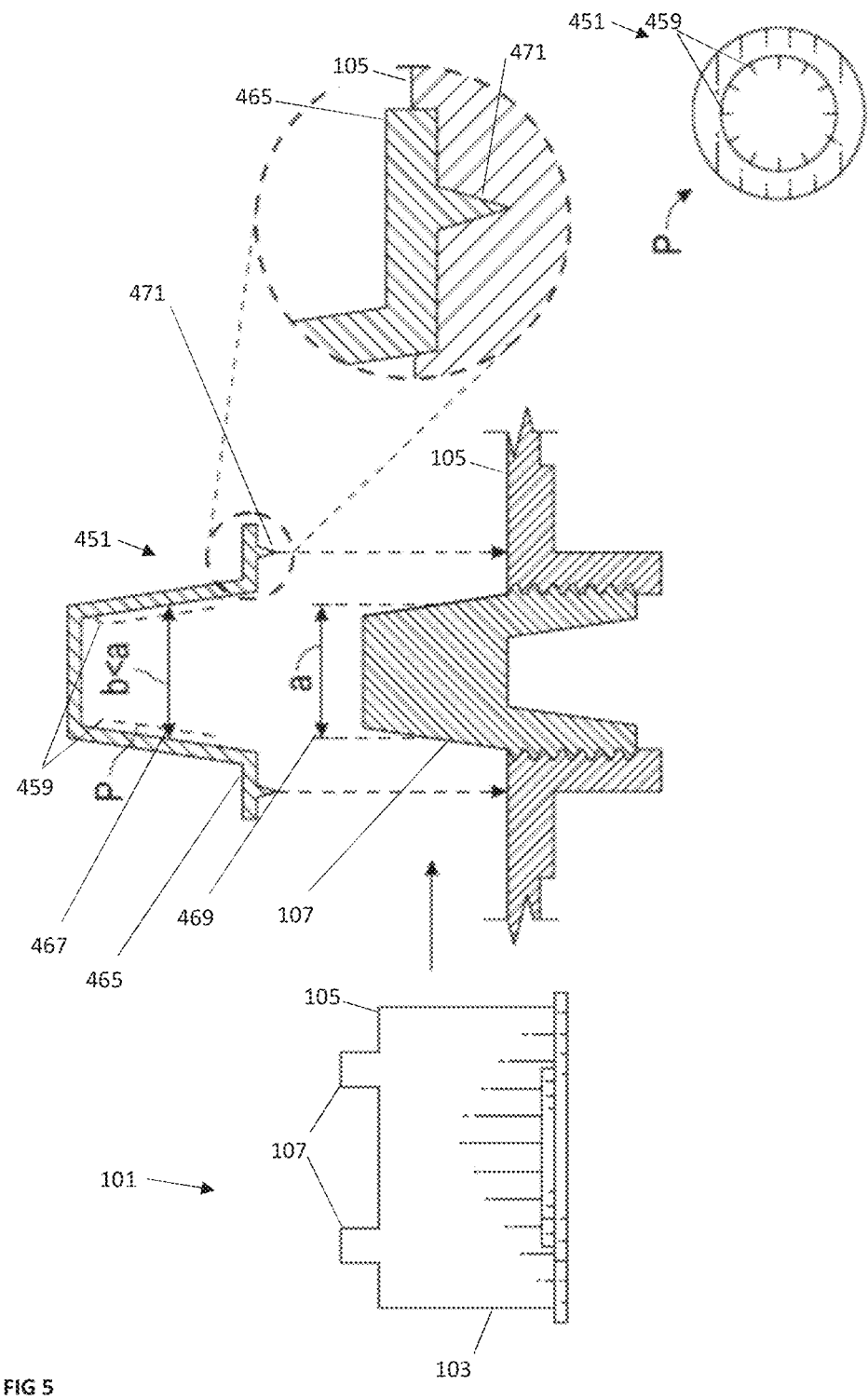
FIG. 5 shows a number of views of a terminal cap for a battery terminal and housing according to various embodiments.

FIG. 5 shows various embodiments of another electrically conductive terminal post cap or cover 451. Again, the cap 451 may be comprised of a conductive material (for example, copper, however, further materials may be contemplated as within the scope of this disclosure). In various embodiments, the cap 451 may be slightly smaller in inner dimensions or diameter 467 compared to the battery terminal diameter 469 on which the cap 451 sits. In other words, in one or more examples of embodiments, the inner diameter of the cap (b) 467, in various embodiments, may be smaller than a diameter of a terminal (a) 469. This may provide a tight or friction fit of the cap on the terminal. In various embodiments, the cap 451 may fit onto the terminal by way of a thermal press-fit.

The cap 451 further may further comprise a sealing ring 465 to be attached, for example, by welding into the surface of the battery housing cover 105. The sealing ring 465 and ring detail 471 may aid in providing a tight connection to the housing 103. The tight connection may aid in preventing exposure of lead of the terminal 107 to the environment. In other words, in various embodiments, the heated metal cap 451 may be pressed into the housing (which may, in various embodiments, comprise polypropylene) to weld to the housing with which ring 465 and ring detail 471 allow for a tight seal between the cap 451 and housing 105.

The cap 451 may further comprise one or more small wings 459 for torque. A cross-section of the cap 451 having the wings 459 may be seen in as reference "P" of FIG. 5. Further, the cap 451 may comprise one or more horizontal structures to prevent removal of the cap 451. In various embodiments, horizontal structures provided within the cap 451 may collide with the lead of the bushing 107 it covers when the metal cap 451 is pushed down for welding. Collision may not occur, for example, if the cap is heated such that the dimension is enlarged during insertion based on temperature elongation (thermal expansion and contraction) as described further herein. In addition, in various embodiments, the cap 451 may comprise a number of vertical wings or ribs inside of the cap in a way that when pressing the cap down the cap is slightly screwed into the bushing. A slight turn may, for example, assist in further seating the cap 451 on the terminal 107.

One or more examples of additional attachment mechanisms for use with a cap (for example, 251, 351, 451) as described herein will now be described. The cap may first be heated, then pressed onto the terminal. Thermal expansion and contraction by the cap (for example, 251, 351, 451) may ensure a tight connection between the terminal 107 (post, bushing) and cap when the terminal 107 is pressed upon from above. In various embodiments, heating the cap (e.g. 251, 351, 451) may allow for forming of the cap (for example, 251, 351, 451) into the lid 105, for example, using a heat sealing ring (for example, 465) on the cap for providing into the housing 103 or lid 105, which may comprise polypropylene. In other words, the sealing ring (for example, 465) may form into melted polypropylene or like material comprising the housing cover 105. The heated cap may allow for melting of the lid 105 and sealing of the connection. In addition, the heated cap may allow for attachment to the cap (for example, 251, 351, 451) to the terminal 107 by way of thermal expansion.

In various embodiments, the cap (for example, 251, 351, 451) may comprise an undercut. The lid 105 may be modified, in various embodiments, to accept the cap. For example, a depression may be provided in the lid to accept the cap. In various embodiments, the cap (for example, 251, 351, 451) may "dig into" the lid or cover 105 material to facilitate a tight seal between the cap and housing cover.

The torque ribs 359 shown in FIG. 4 could also be included in other embodiments of the cap disclosed, for example, in the design described in FIG. 5, and contribute fastening of that cap 451 to the terminal 107. Torque ribs provided into a heated cap could likewise be formed into the softer lead (terminal 107) to make a robust connection.

In addition to the examples described above, the cap (for example, 251, 351, 451) may be attached to the terminal (for example, 107, 507) by a number of methods including welding, solder tin etc., pressure, torque ribs, and the like. The cap may be attached to the housing (e.g. polypropylene lid) by a number of methods including by heat, adhesive, glue, spin welding, heat sealing, laser welding, an overmolded ring at the cap (for example, an overmolded polypropylene ring), and the like. In various embodiments, the cap and cover 105 connection may comprise a pressure-sensitive adhesive.

Caps, such as those provided above (for example, 251, 351, 451), may advantageously allow for attachment after battery formation. For example, whether the terminal is provided with a cap may be based on battery distribution. In one non-limiting example, providing the terminals of batteries with a cap may be made after formation but prior to a battery being shipped to a particular location. This allows for advantages in the manufacturing process. The disclosed cap has a number of additional advantages. The cap may facilitate additional acid tightness due to the sealing ring. The cap may allow for post-manufacturing attachment of a cap as necessary. The cap may allow for modifications to a bushing alloy. The cap may allow for reduced exposure to lead of existing and new batteries.

The caps described herein could be used with a modified battery terminal, in various examples of embodiments. As noted previously and shown in FIG. 6, the bushing or terminal 107 could also be designed with some grooves 509 to produce bushing or terminal 507 which could key in to the torque ribs (for example 359). In other words, in various embodiments, the bushings or terminal 507 may have grooves 509 which mate in various embodiments with torque ribs 359. In general, it should be understood the terminal size or design (for example, 107, 507) may require modification to compensate for the thickness of the cap. In other words, resizing of the terminal due to increased thickness of the cap may be required in order to facilitate connection with standard-size electrical connectors.

Figure 7:
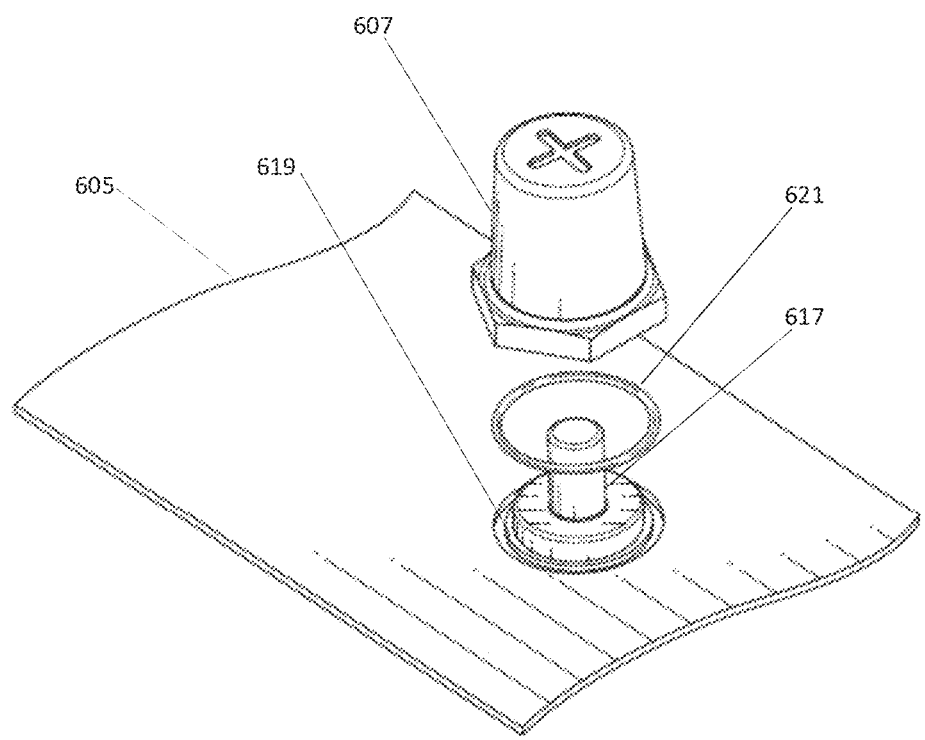
FIG. 7 shows a non-lead battery terminal and bushing, according to various embodiments.

FIG. 7 shows a terminal 607, according to various examples of embodiments. The terminal 607 may be understood to be comprised of a non-lead material (such as, but not limited to, brass, copper alloys, etc.) that is still highly conductive. The terminal 607 may be seen as attaching to the inner electrical path of a battery (for example, the terminal post 617 of a battery 101 (for example, a lead-acid battery)) through a cover 605. The attachment may be made through a connector for example, a stud connector 621. Other methods of connection, such as but not limited to, a sealed welding operation such as sonic or spin welding may be used. The interface between the bushing 607 and the terminal 617 may allow for sufficient area to achieve current-carrying requirements. The terminal 617 and associated components therefore may provide a lead-free interface for a stamped battery terminal connector in a vehicle.

Figure 8:
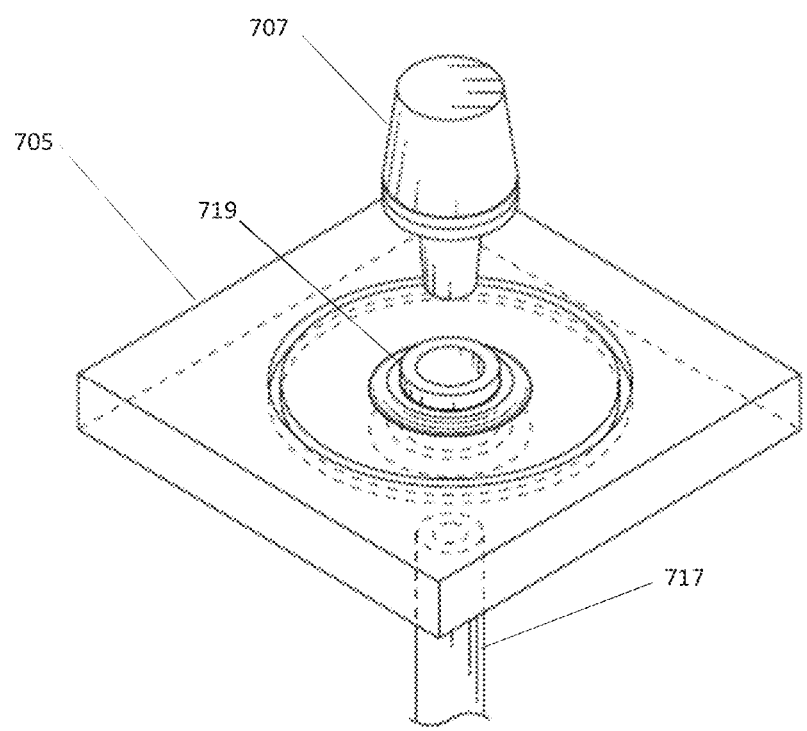
FIG. 8 shows another non-lead battery terminal, according to various embodiments.

FIG. 8 may be seen to show another version of a terminal as described in FIG. 7. Again, the terminal 707 may be seen received by a bushing 719 molded into the cover 705, facilitating connection to the inner electrical components of the battery by way of terminal 717. The terminal 707 may be understood to be connected to the bushing 719 below an exposed surface of the cover 705, resulting in no exposed lead while allowing connection to meet current-carrying requirements.

The various elements of the battery, the battery housing, the battery cover, and the cell containers may be made of a wide variety of materials as is well known in the art. For example, the cover, container, and/or various components may be made of any polymeric (e.g., polyethylene, polypropylene, a polypropylene containing material, etc.) or composite (e.g., glass-reinforced polymer) material. For example, the container may be made of polypropylene-containing material (e.g., pure polypropylene, co-polymers comprising polypropylene, polypropylene with additives, etc.). Such polymeric material is relatively resistant to degradation caused by acid (e.g., sulfuric acid) provided within cells of the container. The terminal posts, side terminals and connection members may be made of one or more conductive materials (e.g., lead or a material containing lead). Likewise, the strap members and end straps may be made of one or more conductive materials (e.g., lead or a material containing lead).

Known terminals may be comprised, in various embodiments, of a lead alloy. In various embodiments, this alloy may be a substantially pure lead and may, in various embodiments, include lead, tin, antimony, calcium, and combinations thereof. The alloy may, as a non-limiting example, be a lead tin alloy with a tin composition range of 1-4%, 1-2.25%, 1-1.5%, and the like. The lead may be virgin lead or high purity lead or highly purified secondary lead, in various examples of embodiments.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A battery having a battery housing and a positive and negative terminal, the positive and negative terminal being accessible through the battery housing; wherein at least one of the positive terminal and the negative terminal further comprise an electrically conductive cap mounted on the at least one of the positive terminal or the negative terminal, wherein the electrically conductive cap comprises no externally exposed lead.

2. The battery of claim 1, wherein the electrically conductive cap comprises an electrically conductive portion comprising a conductive cage.

3. The battery of claim 1, wherein the electrically conductive cap is comprised of a material selected from the group of copper, brass, stainless steel, or nickel.

4. The battery of claim 3, wherein the electrically conductive cap is further comprised of a polymer or resin.

5. The battery of claim 1, wherein the electrically conductive cap further comprises an overmold.

6. The battery of claim 1, wherein the electrically conductive cap connects to a battery cover using one or more components selected from the group consisting of mechanical press-fit, thermal press-fit, adhesive, glue, spin welding, heat sealing, laser welding, or an overmolded ring.

7. The battery of claim 1, wherein the electrically conductive cap further comprises torque ribs.

8. The battery of claim 1, wherein the battery comprises an electrically conductive cap on both the positive terminal and the negative terminal.

9. The battery of claim 1, wherein any exposed surface of the battery is lead-free.

10. A battery terminal assembly composed of a lead battery terminal having an electrically conductive cap positioned over the terminal, wherein the electrically-conductive cap comprises at least a lead free external surface.

11. The battery terminal assembly of claim 10, wherein the terminal comprises an exposed portion comprising lead and the electrically conductive cap covers exposed terminal lead when assembled on a lead acid battery.

12. The battery terminal assembly of claim 10, wherein the electrically conductive cap couples to the terminal by way of a friction fit.

13. The battery terminal assembly of claim 10, wherein the electrically conductive cap comprises a conductive cage.

14. The battery terminal assembly of claim 10, wherein the electrically conductive cap is comprised of a material selected from the group consisting of copper, brass, stainless steel, or nickel.

15. The battery terminal assembly of claim 10, wherein the electrically-conductive cap is further comprised of a polymer or resin.

16. An electrically conductive cap for a lead acid battery terminal comprising:
a recess configured to receive a lead acid battery terminal; and
at least a lead free external surface.

17. The electrically conductive cap of claim 16, wherein the electrically conductive cap comprises an electrically conductive portion comprising a conductive cage.

18. The electrically conductive cap of claim 16, wherein the electrically conductive cap is comprised of a material selected from the group consisting of copper, brass, stainless steel, or nickel.

19. The electrically conductive cap of claim 16, wherein the electrically conductive cap is further comprised of a polymer or resin.

20. The electrically conductive cap of claim 16, wherein the electrically conductive cap further comprises torque ribs.

* * * * *

UNITED STATES PATENT AND TRADEMARK OFFICE
CERTIFICATE OF CORRECTION

PATENT NO. : 11,431,065 B2
APPLICATION NO. : 16/926865
DATED : August 30, 2022
INVENTOR(S) : Jaeppelt et al.

It is certified that error appears in the above-identified patent and that said Letters Patent is hereby corrected as shown below:

In the Specification

1. In Column 1, Lines 3-4, delete "CROSS-REFERENCE TO EXTERNAL APPLICATIONS" and insert -- CROSS-REFERENCE TO RELATED APPLICATIONS --, therefor.

2. In Column 1, Line 6, delete "Continuation" and insert -- continuation --, therefor.

3. In Column 1, Line 7, delete "application Ser. No." and insert -- Application. No. --, therefor.

4. In Column 1, Line 13, delete "entirety." and insert -- entireties. --, therefor.

5. In Column 3, Line 39, delete "seen two" and insert -- seen in two --, therefor.

6. In Column 3, Line 46, delete "understood the" and insert -- understood that the --, therefor.

7. In Column 4, Line 30, delete "cap 259." and insert -- cap 251. --, therefor.

8. In Column 4, Line 35, delete "understood the" and insert -- understood that the --, therefor.

9. In Column 6, Line 34, delete "451 further may further" and insert -- 451 may further --, therefor.

10. In Column 6, Line 44, delete "housing 105." and insert -- housing 103. --, therefor.

11. In Column 7, Line 56, delete "in to" and insert -- into --, therefor.

12. In Column 7, Line 60, delete "understood the" and insert -- understood that the --, therefor.

13. In Column 8, Line 10, delete "bushing 607" and insert -- bushing 619 --, therefor.

Signed and Sealed this
Ninth Day of April, 2024

*Katherine Kelly Vidal*

Katherine Kelly Vidal
*Director of the United States Patent and Trademark Office*

CERTIFICATE OF CORRECTION (continued)
U.S. Pat. No. 11,431,065 B2

14. In Column 8, Lines 10-11, delete "terminal 617" and insert -- terminal 607 --, therefor.

15. In Column 8, Line 12, delete "terminal 617" and insert -- terminal 607 --, therefor.

16. In Column 9, Line 27, delete "show as" and insert -- shown as --, therefor.